United States Patent [19]

Katchka

[11] Patent Number: 5,419,356

[45] Date of Patent: * May 30, 1995

[54] HOT WATER TANK CONSTRUCTION, PARTS THEREFOR AND METHODS OF MAKING THE SAME

[75] Inventor: Jay R. Katchka, Cypress, Calif.

[73] Assignee: Robertshaw Controls Company, Richmond, Va.

[*] Notice: The portion of the term of this patent subsequent to Nov. 16, 2010 has been disclaimed.

[21] Appl. No.: 301,249

[22] Filed: Sep. 6, 1994

Related U.S. Application Data

[62] Division of Ser. No. 110,532, Aug. 23, 1993, Pat. No. 5,348,037, which is a division of Ser. No. 28,990, Mar. 10, 1993, Pat. No. 5,261,438.

[51] Int. Cl.⁶ .................... F16L 55/18; F24H 1/00
[52] U.S. Cl. ........................ 137/15; 285/158; 251/152
[58] Field of Search ............ 137/15, 315, 335; 251/152; 126/361; 285/27, 158

[56] References Cited

U.S. PATENT DOCUMENTS

| | | | |
|---|---|---|---|
| 2,137,214 | 11/1938 | Clayton et al. | 137/335 |
| 3,287,031 | 11/1966 | Simmons et al. | 285/27 |
| 4,422,472 | 12/1983 | Klein | 251/148 |
| 4,770,446 | 9/1988 | Kellar | 285/158 |
| 4,817,564 | 4/1989 | Akkala et al. | 126/361 |
| 4,872,830 | 10/1989 | Katcha et al. | 431/54 |

*Primary Examiner*—A. Michael Chambers
*Attorney, Agent, or Firm*—Candor, Candor & Tassone

[57] ABSTRACT

A hot water tank construction, parts therefor and methods of making the same are provided, the hot water tank construction comprising a hot water tank having a wall provided with an opening therethrough and a spud carried by the wall and having an opening therethrough that is disposed in aligned relation with the opening in the wall, and a fuel control valve unit having a shank provided with a portion thereof disposed in the opening of the spud and being interconnected to the opening of the spud so as to be carried by the wall, the opening of the spud having axial securing structure therein, the portion of the shank having axial securing structure thereon, the portion of the shank having been axially pushed into the opening of the spud until the portion is in a predetermined position thereof whereby the axial securing structures cooperate together to interconnect the fuel control valve unit to the spud.

5 Claims, 3 Drawing Sheets

HOT WATER TANK CONSTRUCTION, PARTS THEREFOR AND METHODS OF MAKING THE SAME

CROSS REFERENCE TO RELATED APPLICATIONS

This application is a divisional patent application of its parent patent application, Ser. No. 110,532, filed Aug. 23, 1993, now U.S. Pat. No. 5,348,037, which, in turn, is a divisional patent application of its parent patent application, Ser. No. 028,990, filed Mar. 10, 1993, now Pat. No. 5,261,438.

BACKGROUND OF THE INVENTION

1. Field of the Invention

This invention relates to a new hot water tank construction and to new parts for such a hot water tank construction as well as to new methods of making such a hot water tank construction and such new parts therefor.

2. Prior Art Statement

It is known to provide a hot water tank construction comprising a hot water tank having a wall means provided with an opening therethrough and a spud carried by the wall means and having an opening means therethrough that is disposed in aligned relation with the opening, and a fuel control valve unit having a shank provided with a portion thereof disposed in the opening means of the spud and being interconnected to the opening means so as to be carried by the wall means. The portion of the shank is externally threaded so that the portion can be threaded into the internally threaded opening means of the spud by rotating the control valve unit.

SUMMARY OF THE INVENTION

It is one of the features of this invention to provide a new hot water tank construction wherein a portion of the shank of a fuel control valve unit can be merely axially pushed into the opening means of a spud on the wall means of a hot water tank until that portion is in a predetermined position thereof so as to interconnect the fuel control unit to the spud.

In particular, the prior known method of assembling a fuel control valve unit to the spud of a hot water tank requires the threading of a portion of the shank of the fuel control valve unit into an internally threaded opening means of the spud and this assembly procedure is not only time consuming and, thus, costly, but also may cause overtorquing of the fuel control valve unit in its threaded relation in order to properly rotationally orient the fuel control valve unit relative to the wall means of the hot water tank.

However, it is believed according to the teachings of this invention that by utilizing a unique arrangement of axial securement means on the shank portion of the fuel control valve unit and in the opening means of the spud so that the fuel control valve unit can be readily assembled to the hot water tank by merely pushing axially inwardly on the fuel control valve unit relative to the spud thereof, not only will such an assembly operation be relatively cost effective, but also such assembly operation can permit the fuel control valve unit to be previously interconnected to the burner structure for the hot water tank and be tested therewith and then be assembled as a self-contained unit to the hot water tank as a subsequent rotation of the fuel control valve unit relative to the hot water tank is not required as in the prior known assembly method.

For example, one embodiment of this invention comprises a hot water tank construction comprising a hot water tank having a wall means provided with an opening therethrough and a spud carried by the wall means and having an opening means therethrough that is disposed in aligned relation with the opening, and a fuel control valve unit having a shank provided with a portion thereof disposed in the opening means of the spud and being interconnected to the opening means so as to be carried by the wall means, the opening means of the spud having axial securing means therein, the portion of the shank having axial securing means thereon, the portion of the shank having been axially pushed into the opening means of the spud until the portion is in a predetermined position thereof whereby the axial securing means cooperate together to interconnect the fuel control valve unit to the spud.

Accordingly, it is an object of this invention to provide a new hot water tank construction having one or more of the novel features of this invention as set forth above or hereinafter shown or described.

Another object of this invention is to provide a new method of making such a hot water tank construction, the method of this invention having one or more of the novel features of this invention as set forth above or hereinafter shown or described.

Another object of this invention is to provide a new part for such a hot water tank construction, the new part of this invention having one or more of the novel features of this invention as set forth above or hereinafter shown or described.

Another object of this invention is to provide a new method of making such a new part for a hot water tank construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
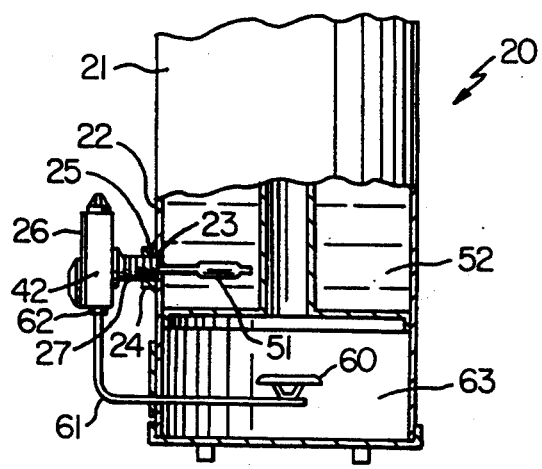
FIG. 1 is a fragmentary schematic view, partially in cross section, illustrating the new hot water tank construction of this invention.

While the various features of this invention are hereinafter illustrated and described as being particularly adapted to provide a hot water tank construction having the fuel control valve unit and the hot water tank thereof of particular configurations, it is to be understood that the various features of this invention can be utilized singly or in various combinations thereof to provide other types of hot water tank constructions as desired.

Therefore, this invention is not to be limited to only the embodiment illustrated in the drawings, because the drawings are merely utilized to illustrate one of the wide variety of uses of this invention.

Referring now to FIG. 1, a new hot water tank construction of this invention is generally indicated by the reference numeral 20 and comprises a hot water tank 21 having a wall means 22 provided with an opening 23 therethrough and a spud 24 carried by the wall means 22 and having an opening means therethrough that is generally indicated by the reference numeral 25 and is disposed in aligned relation with the opening 23 of the wall means 22. The hot water tank construction 20 also comprises a fuel control valve unit 26 having a shank 27 provided with a portion 28, FIG. 3, disposed in the opening means 25 of the spud 24 and being interconnected to the opening means 25 so as to be carried by the wall means 22 whereby the entire fuel control valve unit 26 is, thus, carried by the wall means 22.

Figure 4:
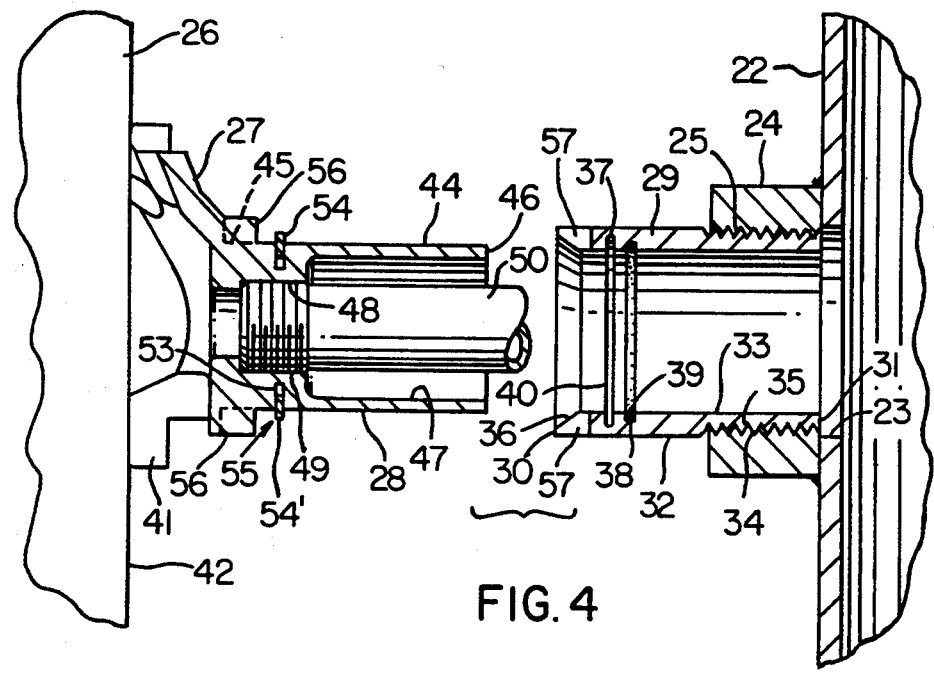
FIG. 4 is a view similar to FIG. 3 and illustrates the fuel control valve unit of this invention before the same is initially assembled into the opening means of the spud of the hot water tank of FIG. 1.

The opening means 25 of the spud 24 is best illustrated in FIG. 4 and comprises a unique shank fitting 29 of this invention that comprises a cylinder or tube formed of metallic material and having opposed ends 30 and 31 and having an outer peripheral surface means 32 and an inner peripheral surface means 33, the end 31 of the shank fitting 29 having the external peripheral surface 32 thereof provided with external threads 34 which are adapted to be threaded into an internally threaded opening 35 of the spud 24 so as to be carried thereby as illustrated.

The shank fitting 29 has an internally beveled surface 36 leading to the internal peripheral surface 33 thereof at the end 30 thereof and the internal peripheral surface 33 is interrupted by two annular grooves 37 and 38 that are disposed spaced from each other, the annular groove 38 having an annular O-ring sealing member 39 disposed therein in a manner well known for O-ring sealing purposes so that a portion of the O-ring 39 normally extends radially inwardly beyond the internal peripheral surface 33 for a sealing function as will be apparent hereinafter.

The annular groove 37 in the shank fitting 29 comprises an axial securing means for the opening means 25 of the spud 24 and is also given the reference numeral 40 so as to be hereinafter referred to as the axial securing means 40 for the opening means 25 of the spud 24 or as the axial securing means 40 for the shank fitting 29 as the case may be.

The shank 27 for the fuel control valve unit 26 has an end 41 that is fastened to the housing means 42 of the fuel control unit 26 by threaded fastening members 43 in a manner conventional in the art and the portion 28 thereof that extends outwardly from the fuel control valve unit 26 has a smooth cylindrical outer peripheral surface 44 that has opposed ends 45 and 46, the portion 28 having a stepped opening means 47 passing therethrough and defining an internally threaded portion 48 in which an externally threaded portion 49 of a conventional rod and tube temperature sensing unit 50 is threaded so as to operate the fuel control valve unit 26 in a conventional manner in relation to the temperature being sensed by an enlarged end 51 of the unit 50 that will be disposed in a water containing chamber 52 of the hot water tank 21 in a conventional manner when the fuel control valve unit 26 has the portion 28 of the shank 27 thereof disposed in the opening means 25 of the spud 24 in a manner hereinafter set forth.

The operation of a fuel control valve unit is well known in the art. For example see the U.S. Pat. No. to Katchka et al, 4,872,830 whereby this patent is being incorporated into this disclosure by this reference thereto. Thus, a further description of the operation of the fuel control valve unit 26 for controlling the heating of the hot water tank 21 is not necessary.

The external peripheral sur, face 44 of the portion 28 of the shank 27 of the fuel control valve unit 26 is interrupted by an annular groove 53 in which an inner portion of a split metallic snap ring 54 is disposed so that an outer edge portion 54' of the ring 54 normally extends radially outwardly beyond the outer peripheral surface 44 of the shank portion 28 through the natural resiliency of the ring 54 in a manner well known in the art. However, the ring 54 is adapted to be cammed inwardly into the groove 53 so that the outer peripheral edge 54' of the ring 54 will be coplaner with the surface 44 of the shank portion 28 as will be apparent hereinafter even though the natural resiliency of the ring 54 is tending to radially outwardly expand the ring 54 to its normal condition illustrated in FIG. 4 wherein the outer peripheral edge 54' of the ring 54 is extending beyond the outer peripheral surface 44 of the shank portion 28. The ring 54 comprises an axial securing means for the shank portion and is also given the reference numeral 55 so as to be hereinafter referred to as the axial securing means 55 for the shank portion 28 of the fuel control valve unit 26.

Figure 5:
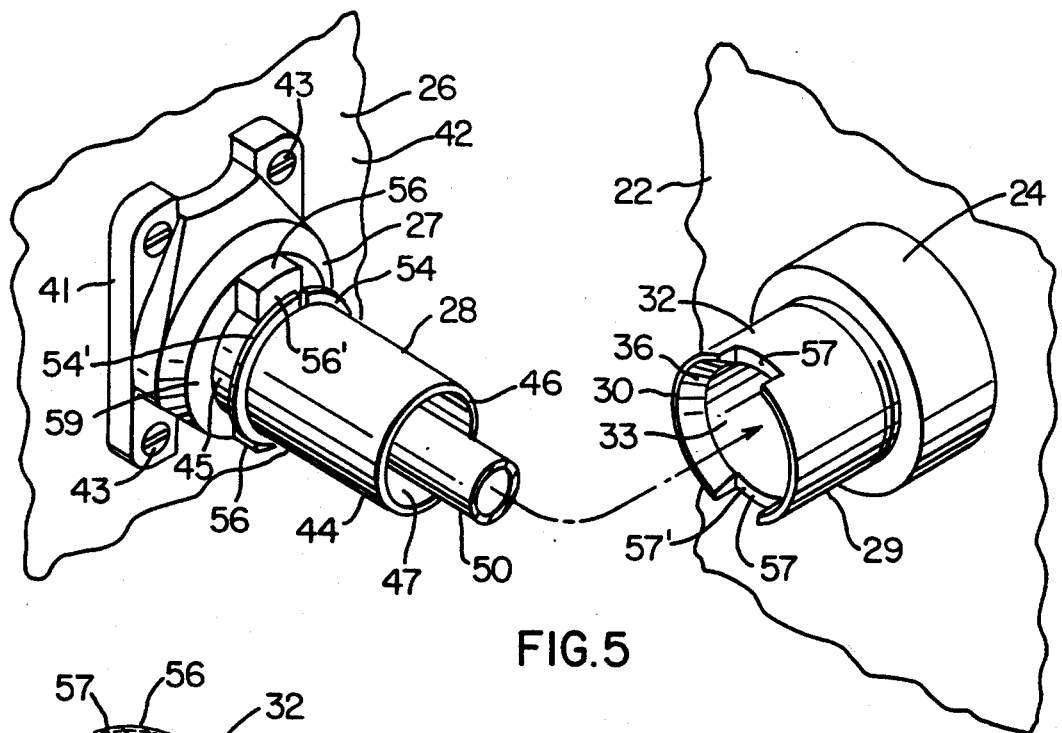
FIG. 5 is an exploded perspective view of the parts illustrated in FIG. 4.

The shank portion 28 of the fuel control valve unit 26 has a pair of projections 56 disposed approximately 180° from each other at the end 45 thereof and are adapted to respectively cooperate with slots 57 formed in the end 30 of the shank fitting 29 as illustrated in FIG. 5 for a purpose hereinafter set forth.

From the above, it can be seen that it is a relatively simple method of this invention to form the fuel control valve unit 26 to have the axial securing means 55 and to form a shank fitting 29 to also have the axial securing means 40, the axial securing means 55 and 40 cooperating together to effectively interconnect the fuel control valve unit 26 to the opening means 25 of the spud 24 of the hot water tank 21 in a unique manner through a simple axial movement of the fuel control valve unit 26 relative to the hot water tank 21 rather than through a rotary threading motion of the fuel control valve unit 26 relative to the hot water tank 21 as in the prior known assembly operation.

In particular, the manufacturer of the hot water tank construction 20 initially threads the shank fitting 29 into the threaded opening 35 of the spud 24 to the position illustrated in FIG. 4 so that the slots 57 in the end 30 of the shank fitting 29 are disposed in vertically aligned relation to subsequently properly rotationally orient the fuel control valve unit 26 thereto as will be apparent hereinafter.

Figure 2:
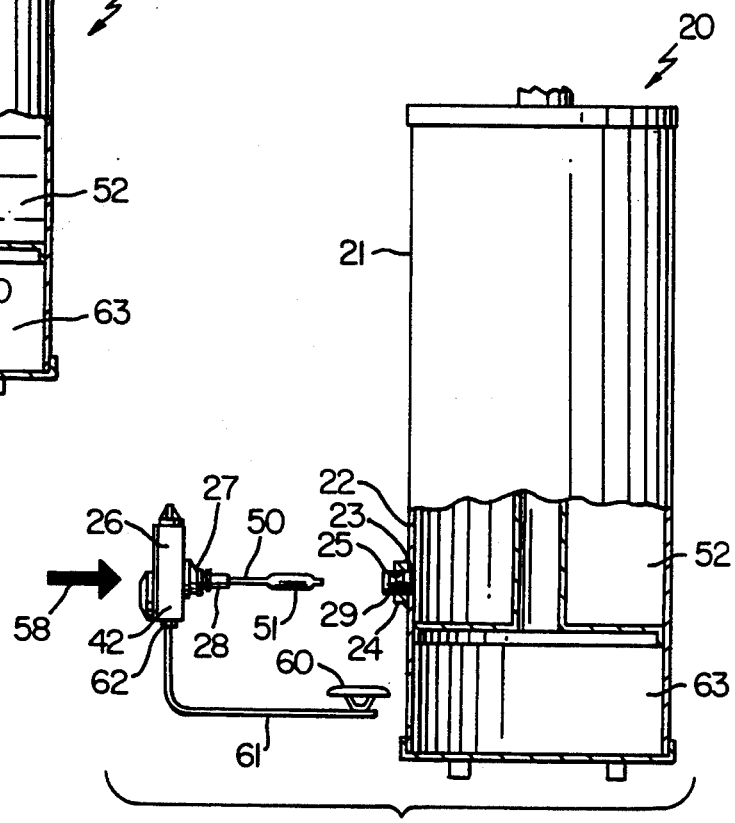
FIG. 2 is a view similar to FIG. 1 and illustrates the fuel control valve unit in exploded relation and before the same has been assembled to the hot water tank of the hot water tank construction.
Figure 3:
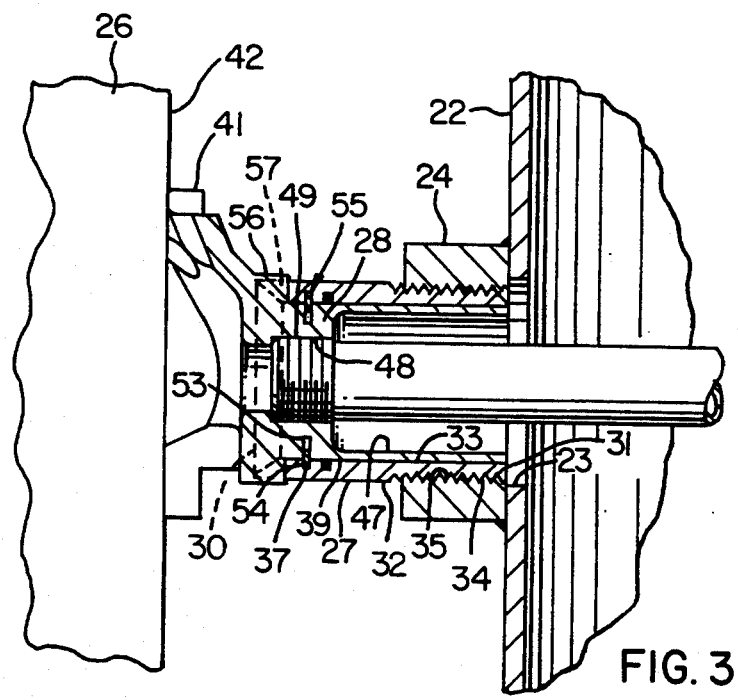
FIG. 3 is an enlarged fragmentary cross-sectional view illustrating the fuel control valve unit of FIG. 1 in its assembled relation with the hot water tank of FIG. 1, FIG. 3 being partially in cross section.

Thereafter, the fuel control valve unit 26, together with its temperature sensing unit 50, is assembled to the hot water tank 21 by merely axially moving the fuel control valve unit 26 in the direction of the arrow 58 in FIG. 2 so that not only does the temperature sensing unit 50 extend through the opening 33 of the shank fitting 29, through the aligned opening 23 of the wall 22 and into the chamber 52 of the hot water tank 21, but also the portion 28 of the shank 27 of the fuel control unit 26 axially enters into the opening 33 of the shank fitting 29 and when the peripheral edge 54' of the ring 54 engages the canning surface 36 at the end 30 of the shank fitting 29, the ring 54 is collapsed into the annular groove 53 of the shank portion 28 to permit the same to clear into the opening 33 of the shank fitting 29 and subsequently be axially aligned with the annular groove 37 thereof so that the ring 54 can radially outwardly expand through the natural resiliency thereof to become locked in the annular groove 37 and thereby interconnect the shank portion 28 to the opening means 25 of the spud 24 as fully illustrated in FIG. 3. At the same time that the ring 54 expands radially outwardly into the groove 37 of the shank fitting 29, the projections 56 of the shank 27 are fully received in the slots 57 of the shank fitting 29 so that either the surfaces 56' of the projections 56 engage against the closed ends 57' of the shank fitting 29 or the end 30 of the shank fitting 29 abuts against a surface 59 of the shank 27 to prevent further axially inward movement of the shank 27 relative to the wall 22 of the hot water tank 21 whereby the fuel control valve unit 26 is now fully interconnected to the hot water tank 21 in its operating position therewith.

Also, it can be seen that the orienting slots 57 of the shank fitting 29 requires vertical alignment of the projections 56 of the shank 27 so that the fuel control valve unit 26 is properly rotationally oriented relative to the wall means 22 of the hot water tank 21.

During such assembly step of axially inserting the shank portion 28 of the fuel control valve unit 26 into the opening 33 of the shank fitting 29, the O-ring sealing member 39 seals against the outer peripheral surface means 44 of the shank portion 28 to prevent leakage of water out of the chamber 52 at the opening means 25 of the spud 24 in a manner well known in the O-ring sealing art.

Since the fuel control valve unit 26 of this invention is merely axially pushed in place in the shank fitting 29 in the manner previously set forth and is not required to be rotated as in the prior known threading operation, various conduit means can be interconnected to the housing 42 of the fuel control valve unit 26 before the same is assembled to the hot water tank 21. For example, it can be seen in FIG. 2 that a burner means 60 for the hot water tank 21 has its fuel feeding conduit means 61 interconnected to an outlet coupling 62 of the fuel control valve unit 26 prior to the fuel control valve unit 26 being assembled with the hot water tank 21. In this manner, the fuel control valve 26 can be tested with the burner means 60 at a place remote from the water heater tank 21 so as to assure that the fuel control valve unit 26 and/or burner means 60 are operating properly before the same are assembled to the tank 21. Of course, the pilot burner means and its feeding conduit means as well as thermocouple means for the burner means 60 can also be preassembled to the fuel control valve unit 26 in a like manner and for a like purpose even though such structure is not illustrated in FIGS. 1 and 2.

Thus, it can be seen from FIGS. 1 and 2 that as the fuel control valve unit 26 is axially moved into the opening means 25 of the spud 24, the burner means 60 and its fuel feeding conduit means 61 are axially moved therewith into a proper position therefor in a heating chamber 63 of the hot water tank 21.

In this manner, it can be seen that the method of this invention for making the hot water tank construction 20 permits a manufacturer to thread the shank fittings 29 in the threaded openings 35 of the spuds 24 of the water heater tanks 21 until the same are disposed in the predetermined positions thereof wherein the slots 57 are disposed substantially in vertically aligned relation and, thereafter, readily assemble the fuel control valve units 26 thereto by merely pushing axially inwardly on such fuel control valve units 26 into the respective shank fittings 29 until the axial securing means 55 of the fuel control valve units 26 align with the axial securing means 40 of the shank fittings 29 to positively interconnect the fuel control valve units 26 to the wall means 22 of the respective hot water tanks 21 to form the new hot water tank constructions 20 of this invention.

Figure 8:
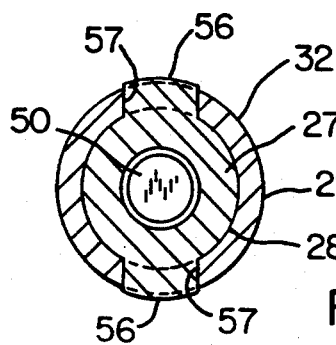
FIG. 8 is a cross-sectional view taken on line 8—8 of FIG. 7.

When it is desired to disassemble a fuel control valve unit 26 from its hot water tank 21, such as in the field wherein the initially installed fuel control valve unit 26 needs to be replaced with a like fuel control valve unit 26 or other similar unit, the service person disconnects all of the conduit means, etc., that are interconnected to the housing means 42 of the fuel control valve unit 26. In this manner, the fuel control valve unit 26 is now adapted to be removed in a normal manner and the service person rotates the housing means 42 so as to unthread that fuel control valve unit 26 from the threaded opening 35 of the spud 24, the shank fitting 29 rotating in unison with the housing means 42 through the driving relation of the projections 56 of the shank 27 in the slots 57 of the shank fitting 29 as illustrated in FIG. 8 whereby the removed fuel control valve unit 26 is in the condition illustrated in FIGS. 6 and 7.

Figure 6:
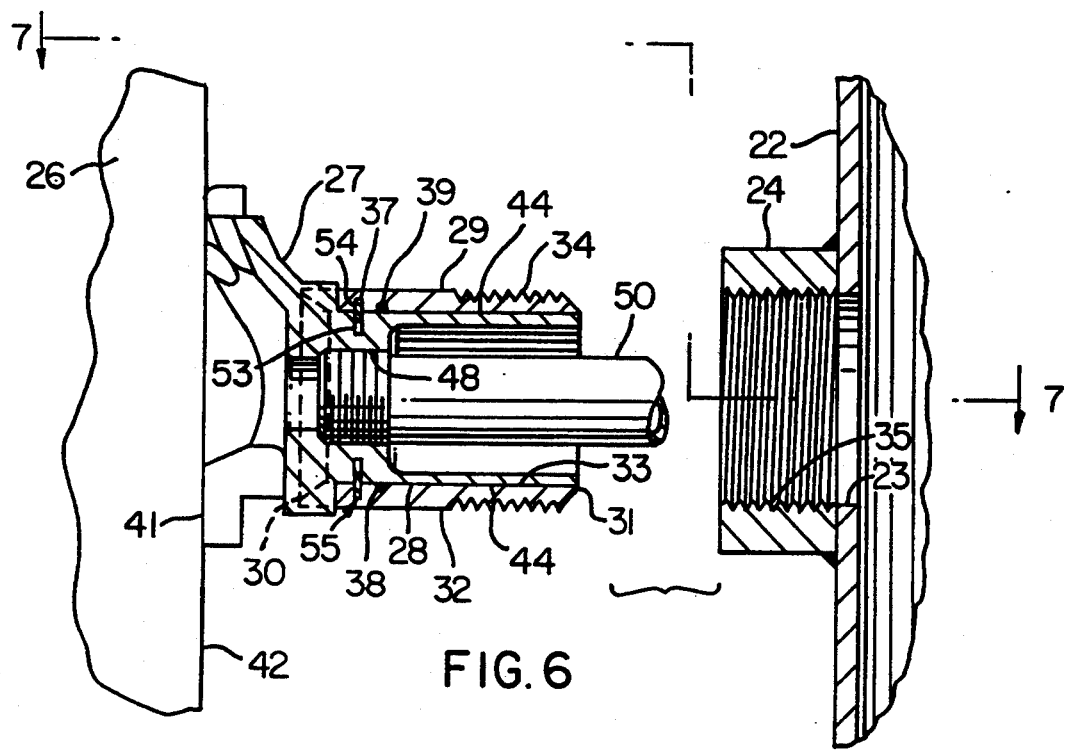
FIG. 6 is a view similar to FIG. 4 and illustrates the fuel control valve unit having been removed from the opening means of the spud of the hot water tank or, a replacement fuel control valve unit that is to be subsequently disposed in the opening means of a hot water tank that is being repaired in the field.

Thus, that service person would then thread the threaded portion of a conventional fuel control valve unit or thread a fuel control valve unit 26 of this invention that has the shank fitting 29 assembled thereto in the manner illustrated in FIG. 6 back into the threaded opening 35 of the spud 24 as in the prior known threading operation by rotating the fuel control valve unit 26 or other unit.

Figure 7:
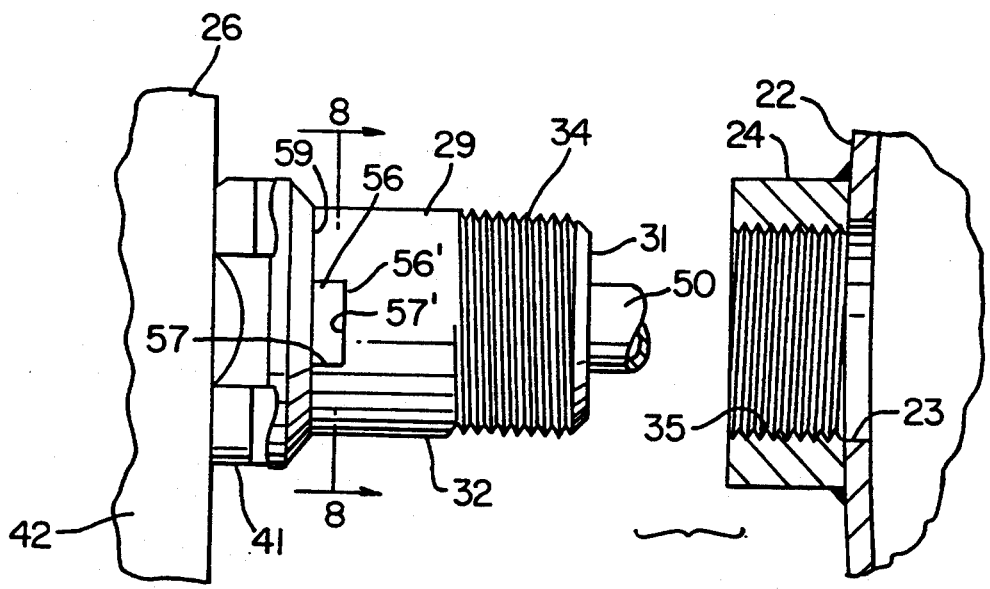
FIG. 7 is a fragmentary cross-sectional view taken on line 7—7 of FIG. 6.

Of course, if that service person is given a replacement fuel control valve unit 26 and its shank fitting 29 being separate therefrom, that service person has the option of either threading the shank fitting 29 itself into the threaded opening 35 of the spud 24 and thereafter axially inserting the shank portion 28 of the new control valve unit 26 therein in the manner illustrated in FIG. 2 or assembling that shank fitting 29 to the shank portion 28 of the new fuel control valve unit 26 as illustrated in FIGS. 6 and 7 before threading the interconnected shank fitting 29 into the threaded opening 35 of the spud 24.

In any event, it can be seen that a service person who is not familiar with the initial assembly operation of the fuel control valve units 26 with the hot water tanks 21 during the initial manufacturing stage thereof, will remove a fuel control valve unit 26 in the field in exactly the same manner that that service person would have removed a prior known fuel control valve unit from a hot water tank in order to replace the same with a new fuel control valve unit in the old manner.

Thus, it can be seen that this invention not only provides a new hot water tank construction and a new method of making the same, but also this invention provides new parts for such a new hot water tank construction and new methods of making such parts.

While the shank fitting 29 of this invention permits a conventional spud 24 of a hot water tank to be converted to a structure that permits the axial assembly of the shank portion 28 of the fuel control valve construction 26 of this invention thereto, it is to be understood that a spud could be made that has the axial securing means 40 therein rather than the internal threads so that the opening 35 thereof would be smooth and not threaded and would have an inner diameter that is slightly larger than the outer diameter of the shank portion 28 of the fuel control valve device so as to axially receive the same therein and have the axial securing means 55 of the shank portion 28 subsequently cooperate with the axial securing means 40 of the spud in the same manner as previously set forth except that the shank fitting 29 is not being utilized as the modified spud itself provides all of the functions of the shank fitting 29.

Also, while the shank fitting 29 and shank portion 28 have only two cooperating slots 57 and projections 56, it is to be understood that any number could be used. For example four such slots 57 and projections 56 could be provided and each be spaced 90° from the next.

In addition, while one type of cooperating axial securing means 40 and 55 have been disclosed, it is to be understood that any other suitable axial securing means can be utilized, as desired.

It is also to be understood that while the hot water tank 21 is schematically illustrated in FIGS. 1 and 2, suitable and conventional heat insulation means for the hot water tank 21 can be provided, as desired.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a hot water tank construction comprising a hot water tank having a wall means provided with an opening therethrough and a spud carried by said wall means and having an opening means therethrough that is disposed in aligned relation with said opening, and a fuel control valve unit having a shank provided with a portion thereof disposed in said opening means of said spud and being interconnected to said opening means so as to be carried by said wall means, the improvement comprising the steps of threading a tubular shank fitting into an internally threaded opening passing through said spud whereby a tubular passage through said shank fitting comprises said opening means of said spud, and then pushing said portion of said shank axially into said tubular passage of said shank fitting until securing means of said portion interconnects with securing means of said shank fitting and thereby interconnects said fuel control valve unit to said spud.

2. A method as set forth in claim 1 and comprising the step of interconnecting fuel burner means for said hot water tank to said fuel control valve unit before the step of pushing said portion axially into said tubular passage of said shank fitting whereby said burner means will be properly positioned relative to said hot water tank when said securing means are interconnected together.

3. A method as set forth in claim 2 and comprising the step of testing said fuel control valve unit and said fuel burner means after the same are interconnected together and before the step of pushing said portion axially into said tubular passage of said shank fitting.

4. A method as set forth in claim 1 wherein the step of threading said tubular shank fitting into said spud is terminated when an orienting means of said shank fitting is in a predetermined position relative to said hot water tank and wherein the step of pushing said portion of said shank axially into said tubular passage of said shank fitting requires an orienting means of said portion of said shank to axially orient with said orienting means of said shank fitting before said securing means can interconnect together whereby said fuel control valve unit is properly rotationally oriented with said hot water tank when said securing means interconnect together.

5. A method as set forth in claim 1 wherein the step of pushing said portion of said shank axially into said tubular passage of said shank fitting causes sealing means of said portion of said shank to seal with sealing means in said tubular passage of said shank fitting before said securing means interconnect together whereby when said securing means interconnect together said sealing means tend to prevent leakage of liquid from said tank through said tubular passage of said shank fitting.

* * * * *